May 15, 1962

S. KARPCHUK 3,034,361

BALANCING EQUIPMENT

Filed Jan. 7, 1960

INVENTOR
Sylvester Karpchuk
BY
Synnestvedt & Lechner
ATTORNEYS

May 15, 1962 S. KARPCHUK 3,034,361
BALANCING EQUIPMENT

Filed Jan. 7, 1960 2 Sheets-Sheet 2

INVENTOR
Sylvester Karpchuk
BY
ATTORNEYS 3,034,361
BALANCING EQUIPMENT
Sylvester Karpchuk, Philadelphia, Pa., assignor to Tinius Olsen Testing Machine Company, Willow Grove, Pa., a corporation of Pennsylvania
Filed Jan. 7, 1960, Ser. No. 1,122
1 Claim. (Cl. 73—471)

This invention relates in general to apparatus for rotatably supporting an article to be tested for unbalance and in particular relates to improvements in apparatus for supporting the test article and to improvements in apparatus for rotating the test article.

In one broad aspect the invention contemplates a frame or cradle constructed for mounting a rotating test article, the unbalance of the article causing the cradle movement and the cradle being supported by flexible or elastic means which confines movement of the cradle to a rocking motion in a plane and about an axis substantially normal to the plane, the rotating article being supported so that its axis of rotation is normal to the rocking axis.

In another aspect the invention contemplates a cradle constructed for mounting a rotating test article, the unbalance of the article causing cradle movement and the cradle being supported by flexible or elastic means which confines movement of the cradle to a rocking motion in a vertical plane and about a horizontal axis which is normal to the plane, the rotating article being supported so that its axis of rotation is normal to the rocking axis.

In another broad aspect the invention contemplates a frame or cradle constructed for mounting a rotating test article, the unbalance of the article causing cradle movement and the cradle being supported by flexible or elastic means which confines movement of the cradle to a rocking motion in a plane and about an axis substantially normal to the plane, the rotating article being supported so that its axis of rotation is normal to the rocking axis together with flexible means for driving the article, the torque of the flexible means being applied in a plane containing the rocking axis.

In another aspect the invention contemplates a frame or cradle for supporting a rotating test article, the unbalance of the article causing cradle movement and the cradle being supported by elastic means which confines movement of the cradle to a rocking motion in a vertical plane and about a horizontal axis which is substantially normal to the plane, the rotating article being supported so that its axis of rotation is normal to the rocking axis together with flexible means for driving the article, the torque of the flexible means being applied in a plane containing the rocking axis.

One preferred form of the invention contemplates a generally upright frame mounted on a pair of elastic supports in the form of vertically-extending flexure plates which confine the movement of the cradle due to unbalance of a rotating test article to a rocking motion in a vertical plane and about a horizontal axis containing portions of the plates.

Another preferred form of the invention contemplates a generally upright frame supported on a pair of elastic supports in the form of flexure plates which confine the movement of the cradle due to unbalance of a rotating test article to a rocking motion in a vertical plane and about a horizontal axis containing portions of the plates together with drive mechanism for rotating the article including a pulley and belt system arranged so that its torque is applied in a plane containing said axis.

The preferred construction of the invention will be described in detail below in connection with the following drawings wherein.

Figure 1:
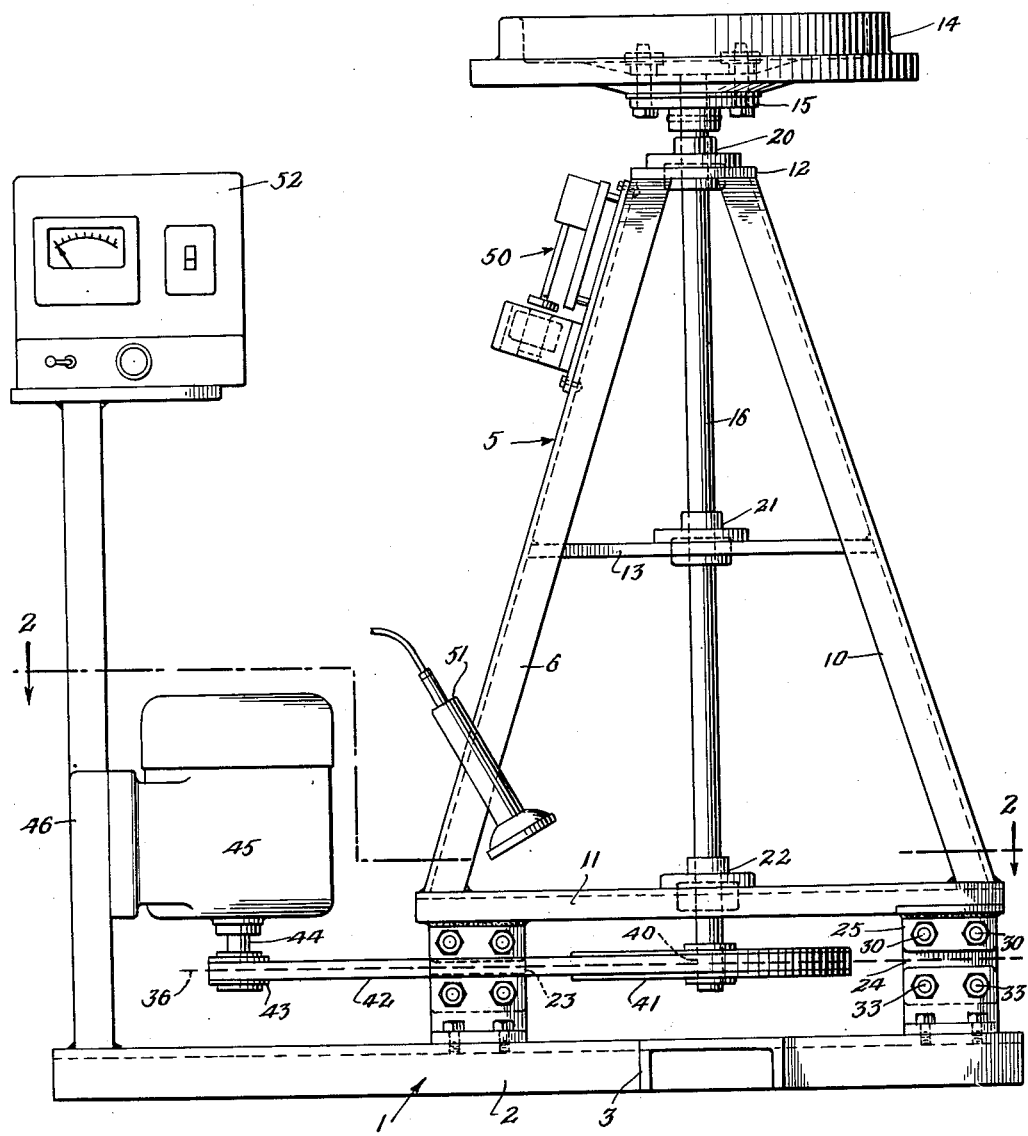
FIGURE 1 is a vertical elevational view illustrating a balancing machine incorporating the invention.

The base 1 of the machine comprises a main section 2 together with wing sections 3 and 4 all of which are constructed from U beams and welded together.

The frame or cradle 5 is generally triangular in shape comprising side pieces 6 and 10, bottom piece 11 and top piece 12 and cross piece 13. All of the foregoing pieces are welded together to make a unified, rigid structure.

The mechanism for mounting a rotating article to be tested for unbalance comprises an adapter 14 fixed to a mounting plate 15 and secured to a shaft 16. The shaft 16 is rotatably supported by bearing structures 20, 21, 22 respectively disposed on the top piece 12, cross piece 13 and bottom piece 11. The adapter 14 may be of any particular form or construction depending upon the type of article to be tested for unbalance.

The cradle 5 is supported by elastic or flexible means. As shown, this takes the form of flexure plates 23 and 24. Since the flexure plates are preferably identical in construction and the manner of connecting the same between the base and the frame is the same, only the flexure plate 24 and its connecting pieces will be described. The flexure plate is essentially a generally rectangular or square piece of metal which has good elastic properties. The top of the flexure plate is firmly secured between a bracket 25 and a clamp 26 by the nut and bolt assembly 30. The bracket 25 is fixed to the bottom piece 11. The bottom of the flexure plate is firmly secured between an L-shaped bracket 31 and a clamp 32 by the nut and bolt assembly 33. The bracket 31 is fixed to the base 1. From an inspection of FIGURE 2 it will be seen that the flexure plates 23 and 24 lie in the same plane and that this plane also contains the axis of the shaft 16.

From the foregoing description it will be apparent that the adapter 14, the mounting plate 15 and shaft 16 are all rotatable. Therefore, if the shaft 16 is rotated, the article mounted in the adapter 14 will partake of the same rotation. Any unbalance in the article will, of course, exert a force on the cradle and cause a cradle movement which is primarily a function of the amount of unbalance and rotational speed.

Figure 3:
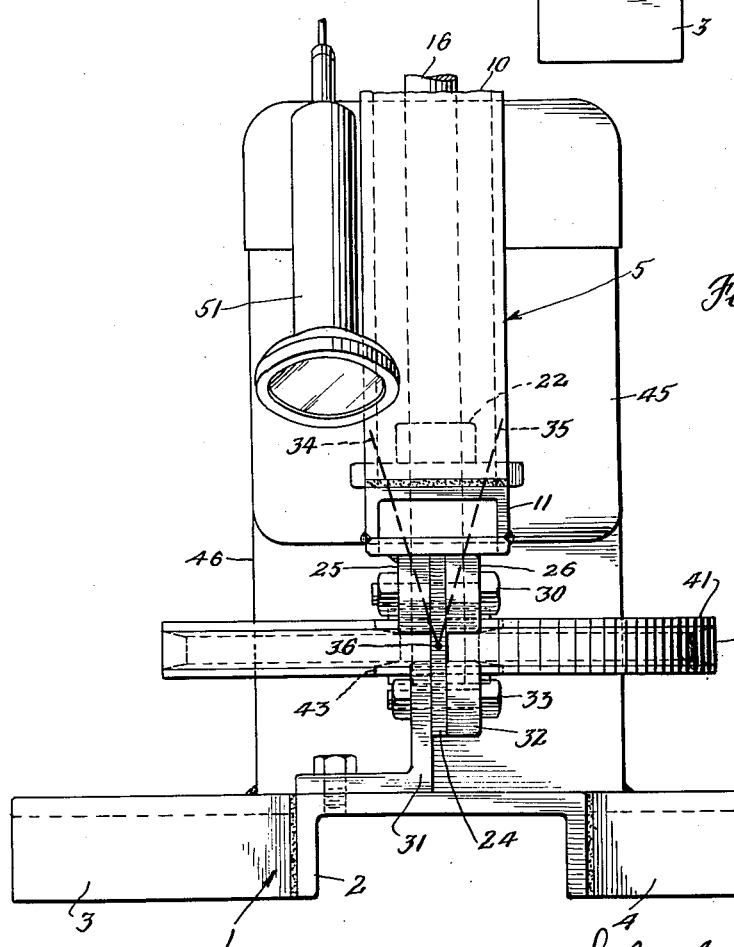
FIGURE 3 is an enlarged fragmentary view looking toward the left in FIGURE 1 and illustrating the location of the flexure plates relative to certain portions of the drive mechanism.

Assuming that an article to be tested is rotating the force exerted by the unbalance will react against the cradle and cause the same to move. The flexure plates 23 and 24 will confine this motion to a rocking motion in a plane and about a rocking axis which is normal to the plane, the axis containing the flexure plates 23 and 24. The rocking is illustrated in FIGURE 3 where the heavy dotted lines 34 and 35 represent the limits of cradle motion in opposite directions and the dotted line 36 (FIGURE 1) represents the rocking axis about which such motion takes place. The positions of dotted lines 34 and 35 are, of course, exaggerated, simply to illustrate the point, the actual motion of the cradle being in the order of a few thousandths of an inch. As illustrated, the plane of cradle motion is vertical and the axis 36 is horizontal. The position of the axis (in a vertical direction) may vary depending, for example, on the amount of unbalance of the article under test. In other words, the locus of flexure of each plate is variable depending upon the amount of unbalance. As will be apparent from the foregoing description, the test article is supported so that its rotational axis is transverse (in this case normal to) the rocking axis.

The flat, planar construction of the plates together with the fact that they are rigidly connected both to the base and frame throughout their width contribute to confining the motion of the cradle as described above.

The invention contemplates that the driving torque be applied in a plane containing the rocking axis 36 and that the torque applying means include a flexible element.

The application of torque in a plane containing the axis 36 is of considerable advantage in that no moment arms developed by the torque are transmitted to the cradle 5 so as to cause rocking motion. Including a flexible element in the torque applying means is of importance in that it mechanically isolates the cradle from forces in the drive mechanism which otherwise might be transferred to the cradle and cause the same to rock.

A typical arrangement for accomplishing the foregoing is described below. With reference to FIGURE 1 it will be seen that the shaft 16 has a portion 40 which contains the axis 36. The portion 40 mounts a pulley 41 over which runs the belt 42 connected to another pulley 43 mounted on the drive shaft 44 of an electric motor 45 mounted on the pedestal 46 secured to the base. It will be observed that the pulley 41, belt 42 and the pulley 43 are all in a plane containing the axis 36.

Figure 2:
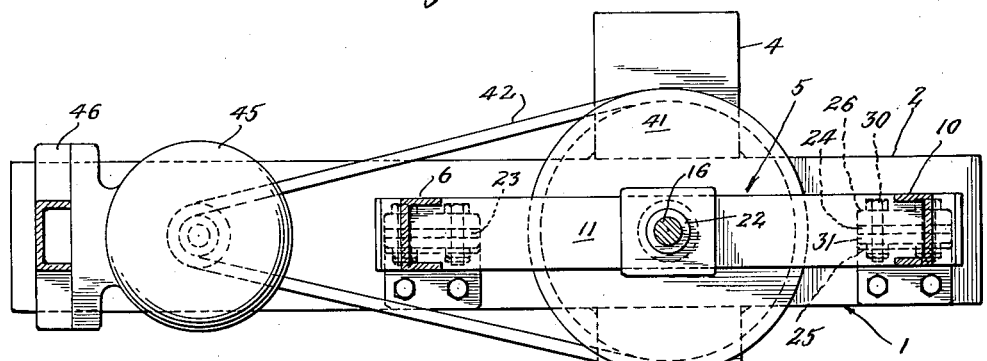
FIGURE 2 is a plan view taken along the lines 2—2 of FIGURE 1.

Not only do the pulleys and belt lie in a plane containing the rocking axis, but, with reference to FIGURE 2, it will be observed that the belt 42 is symmetrically disposed about the axis 36 and runs generally in the same direction as the axis. This disposition is of particular advantage in that it further minimizes any tendency for the pulley or drive system to exert a force on the end of shaft 16 which would tend to rock the cradle 5.

It is contemplated that known methods be used for determining the amount and angle of unbalance in the article to be tested. Equipment for determining the amount and angle of unbalance may comprise a pickup 50 mounted directly on the cradle and developing an electrical signal proportional to the amount of unbalance, a stroboscopic lamp 51 (mounted on a standard cradle, not shown) and used in the determination of angle of unbalance together with certain circuitry (not shown) enclosed within the cabinet 52 mounted on the pedestal 46.

I claim:

In a balancing machine:

a base;

a frame spaced from said base;

a pair of flexure plates interconnecting the frame with the base, the plates being spaced from one another and both lying in a plane;

means on said frame for rotatably mounting an article to be tested for unbalance, the unbalance of the article causing vibration of the frame and said flexure plates restraining vibration of the frame about a rocking axis which contains said plates;

a drive shaft connected with said mounting means and extending between said plates, the axis of the drive shaft lying in the plane containing the flexure plates and intersecting said rocking axis;

a pulley disposed between said flexure plates and connected to said drive shaft;

a drive belt interconnected with said pulley; and a drive pulley connected with said belt, said pulleys and said belt all lying in a plane containing said rocking axis.

References Cited in the file of this patent

UNITED STATES PATENTS

| | | |
|---|---|---|
| 728,315 | Snell | May 19, 1903 |
| 2,043,845 | Thearle | June 9, 1936 |
| 2,403,513 | Forsberg | July 9, 1946 |
| 2,817,972 | Bokorney | Dec. 31, 1957 |
| 2,891,241 | Fibikar | June 16, 1959 |

FOREIGN PATENTS

| | | |
|---|---|---|
| 803,307 | Great Britain | Oct. 22, 1958 |